UNITED STATES PATENT OFFICE.

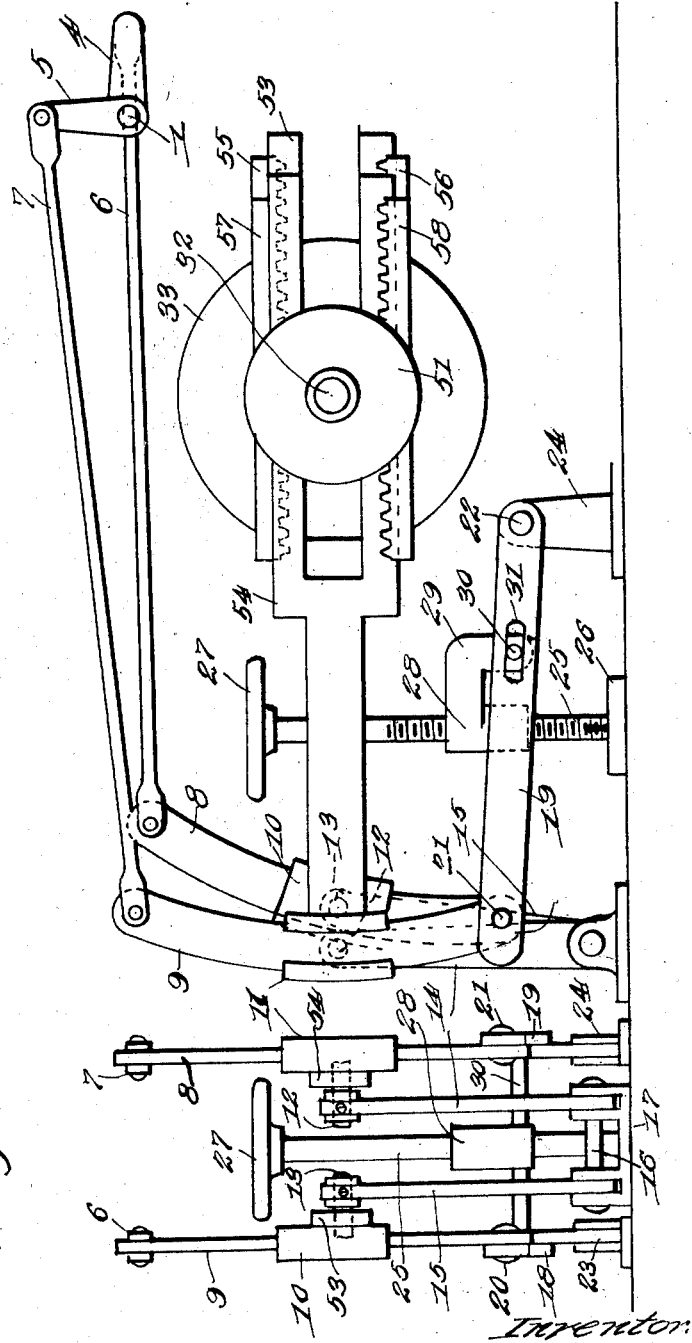

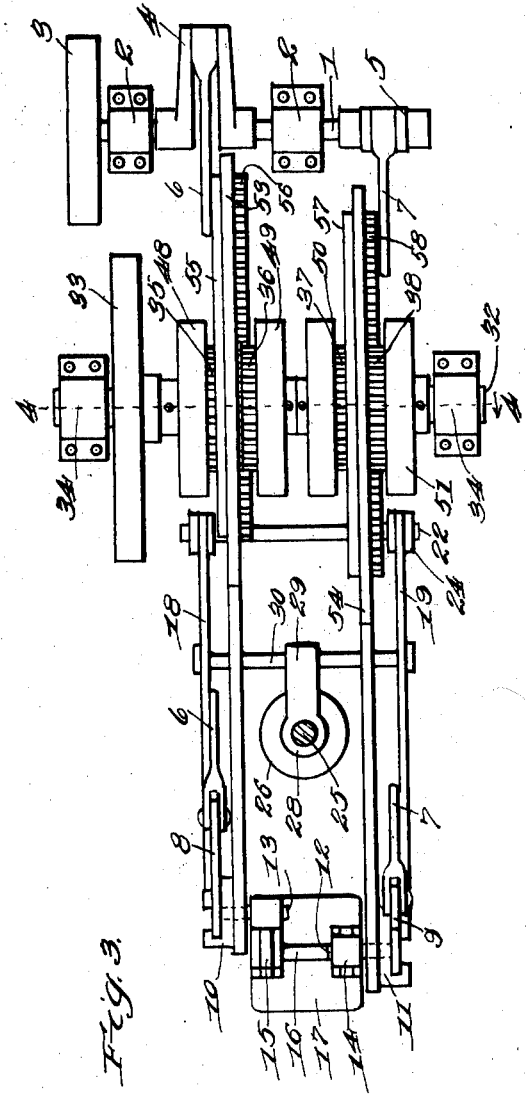

WILLIAM KESSLER, OF SPRAGUE, WASHINGTON.

CHANGE-SPEED MECHANISM.

1,401,538. Specification of Letters Patent. Patented Dec. 27, 1921.

Application filed November 8, 1919. Serial No. 336,738.

*To all whom it may concern:*

Be it known that I, WILLIAM KESSLER, a citizen of the United States, residing at Sprague, in the county of Lincoln and State of Washington, have invented new and useful Improvements in Change-Speed Mechanism, of which the following is a specification.

This invention relates to change speed and power transmission mechanism wherein power is taken from a constant speed driven shaft and transmitted to a second shaft to drive the latter in one direction and at different speeds.

My invention involves that type of mechanism wherein a link motion is employed, and in this combination, it is a special feature of my invention to impart motion to the links of said mechanism in such a manner that a constant rotary propulsive thrust will be delivered to said second shaft.

It is also a feature of my invention to provide a novel means whereby a plurality of such links may be adjusted in unison, the adjustment being of a character such as will hold the links in any position to which they have been adjusted, such link adjustment serving to vary the leverage and also the speed of said second shaft.

A further object of this invention is one seeking to avoid or minimize the objectionable feature of excessive friction which has heretofore been a drawback to mechanism of this character.

Other features and objects of the invention will be more fully described in connection with the accompanying drawings and will be more particularly pointed out in and by the appended claims.

In the drawing:—

Figure 1, is a view in side elevation of one embodiment of my invention.

Fig. 2, is an end view looking from the left of Fig. 1.

Fig. 3, is a plan view.

Fig. 4, is a sectional view on line 4—4 of Fig. 3.

Fig. 5, is a sectional view on line 5—5 of Fig. 4.

Like characters of reference designate similar parts throughout the different figures of the drawings.

As illustrated, 1 designates a main constant speed driving shaft which may be mounted in suitable bearings 2. This shaft may be directly connected with the shaft of an engine or power may be delivered thereto through a belt wheel 3, in accordance with the use to which the device of my invention is applied. The utilities of a mechanism of this character are so well known and of such wide range that no attempt will be made to enumerate them. The shaft 1 has crank portions 4 and 5 which are arranged at quarters or in staggered relation. A link rod 6 has one end connected with portion 4 and a rod 7 has an end connected with portion 5.

The remaining ends of said rods are pivoted to arcuate change speed links 8 and 9, respectively, and in the present embodiment, to the upper ends thereof. Said arcuate links are slidably mounted longitudinally in arcuate guides 10 and 11, respectively. Said guides are loosely mounted on rack bar pivots 12 and 13. Supporting uprights 14 and 15 are pivotally mounted at 16 upon a suitable base 17. Pivots 12 and 13 are fixedly journaled in the upper ends of said uprights and extend into said guides 10 and 11 to support the latter.

Reference will next be made to the novel manner in which said links 8 and 9 may be adjusted in unison notwithstanding the fact that they are oscillated out of synchronism and serve to actuate independent reciprocating members.

Supporting and adjusting arms 18 and 19 are pivoted at 20 and 21 to the lower ends of said links and the remaining ends of said arms are pivoted as at 22 to standards 23 and 24. An adjusting screw 25 is suitably swiveled in a base 26 and is provided with a handwheel 27. A nut 28 has threaded engagement with said screw 25 and is provided with an arm 29 which carries a rod 30. Rod 30 extends through slots, such as 31 in arms 18 and 19 and as the screw 25 is turned in opposite directions, the arms 18 and 19 will be raised or lowered in unison thereby lengthening or shortening the stroke of certain reciprocating members to be presently described.

A driven shaft is designated at 32 and may be provided with a wheel 33 from which power may be taken off, this being a detail not important to this invention and capable of mechanical variation dependent upon the utility of this invention. Shaft 32 will be mounted in suitable bearings 34, which like the bearings 2, have been omitted in Fig. 1 for the purpose of clearness of illustration. Shaft 32 has a plurality of sets of mechanism to which thrust is applied to impart rotary movement to shaft 32. In the present instance, two sets of such mechanisms is employed, the sets being designated at *a* and *b*. Set *a* has a pair of gear pinions 35 and 36 and set *b* has a like pair 37 and 38. Said pinions are loosely mounted on shaft 32 and are provided with pawl-carrying disks 39, 40, 41 and 42. Pawls 43, 44, 45 and 46 are pivoted to said disks in the manner shown in Fig. 5, in connection with pawl 46. Each pawl is actuated by a spring 47 whereby it is maintained in operative engagement with the ratchet teeth of the particular ratchet wheel which it is expected to drive. Ratchet wheels 48, 49, 50 and 51 are keyed onto shaft 32, or otherwise non-rotatively fixed thereto and each wheel is provided with ratchet teeth such as is indicated at 52, in connection with wheel 51, of Fig. 5.

A reciprocating member or rack bar is provided for each set of mechanism, bar 53 for mechanism *a* and bar 54 for mechanism *b*. These bars are shown bifurcated in order to fork the shaft 32. The upper fork portion of bar 53 carries a rack 55 which meshes with pinion 35. On the lower fork of bar 53 is a rack 56 which meshes with pinion 36. Bar 54 carries a rack 57 which meshes with pinion 37 and it also carries a rack 58 which meshes with pinion 38. It will be observed by reference to the drawings how the racks mesh with oppositely disposed peripheral points of the pinions and it will be clear that as the racks are reciprocated in one direction the pawl of one pinion disk will lock in the teeth of its ratchet wheel and impart thrust to the shaft 32 while the remaining pawl will ride freely over its respective ratchet wheel. It will also be observed that the upper racks 55 and 57 function as supporting means for the rack bars 53 and 54, the latter being held against lateral movement by being interposed between the pinions 35 and 36 and 37 and 38. Furthermore, it will be noted that the opposed disposition of the racks, engaging the pinions at opposite peripheral points thereof, not only serves to prevent the bars from getting out of mesh with their respective pinions but also avoids the necessity of the bars being guided to a linear path of travel.

The remaining ends of the rack bars 53 and 54 are mounted on pivots 13 and 12 which are the same pivots to which the guides 10 and 11 are mounted.

It will now be clear that as shaft 1 is rotated, the links 8 and 9 will be oscillated about pivots 20 and 21. This will impart reciprocating movement to rack bars 53 and 54 and in each reciprocating stroke of said bars, rotary motion will be imparted to the pinions with which the bar racks mesh, one pinion of each set of mechanism positively thrusting the shaft 32 in one direction of rotation. This continuous rotary positive thrust is afforded by reason of the fact that the crank portions 4 and 5 are at quarters, or in staggered relation, thereby avoiding the momentary lapse of action that would otherwise result when the cranks are passing a dead center position with respect to their rods 6 and 7. Thus it will be seen that as crank portion 4 is traversing a dead center, crank portion 5 is active, and as a consequence, the shaft 32 will be constantly driven.

Because of the fact that the bars 53 and 54 are pivotally mounted on the supporting uprights 23 and 24, what friction results will be localized to pivotal connections thereby greatly reducing the friction as compared to a crosshead or other sliding connection.

It will be clear that as the nut 28 is raised from the position shown, a greater extent of the length of the links 8 and 9 will be disposed above the pivots 12 and 13 thereby shortening the reciprocating stroke of the bars 53 and 54, a corresponding lowering movement of the links serving to lengthen the stroke. In any event, the threaded adjusting means including the rod 25 and nut 28 serves to hold the arms 18 and 19, locked, in any position to which they may be adjusted.

It is believed that the novelty and utility of my invention will be fully understood from the foregoing description and I do not wish to be limited thereto except for such limitations as the claims may import.

I claim:—

1. In a change speed transmission mechanism, a main constant speed driving shaft, a second or driven shaft, ratchet mechanism for said second shaft, a reciprocating rack bar for operating said mechanism to rotate said second shaft and being partly supported by said mechanism, a pivoted upright, a rack bar pivot connecting said bar with said upright, an arcuate link guide loosely mounted on said rack bar pivot, an arcuate link longitudinally slidable in said guide and having one end in driven connection with said driving shaft, and adjustable means pivoted to the other end of said link for adjusting the latter in said guide to vary the reciprocating stroke of said rack bar.

2. In a change speed transmission mechanism, a main constant speed driving shaft, a second or driven shaft, ratchet mechanism for said second shaft, a reciprocating rack bar for operating said mechanism to rotate said second shaft and being partly supported by said mechanism, a pivoted upright, a rack bar pivot connecting said bar with said upright, an arcuate link guide loosely mounted on said bar pivot, an arcuate link longitudinally slidable in said guide and having one end in driven connection with said driving shaft, and adjustable worm means pivoted to the other end of said link for adjusting the latter in said guide to vary the reciprocating stroke of said rack bar.

3. In a change speed transmission mechanism, a main horizontally disposed constant speed driving shaft, a second or driven shaft in parallel relation with said driving shaft, sets of ratchet mechanism for said second shaft, a reciprocating rack bar for each set of ratchet mechanism and each bar having racks for engagement with said mechanism to actuate the latter in both stroke directions of said reciprocating rack bars to drive said second shaft in one direction, a pivoted upright for each rack bar, a rack bar pivot connecting each bar with its respective upright, an arcuate link guide on each of said rack bar pivots, an arcuate link longitudinally slidable in each guide, said main shaft having crank portions in staggered relation and said crank portions being connected with said links to continuously oscillate the same thereby continuously imparting rotary thrust to said second shaft, and means for slidably adjusting said links in unison to vary the speed of said second shaft.

4. In a change speed transmission mechanism, a driving crank shaft with the crank portions thereof off centered with respect to each other, a second shaft, sets of mechanism for engagement with the second shaft to impart rotary thrust thereto upon reciprocating actuation of said sets of mechanisms, a reciprocating member for each set of mechanism, an arcuate link slidably connected with each reciprocating member and actuated by said crank shaft, and worm mechanism connected with both of said arcuate links to adjust and hold the same in unison to vary the length of strokes of said reciprocating members.

5. In a change speed transmission mechanism, a driving crank shaft, a second shaft, sets of rotary mechanism for engagement with said second shaft to impart continuous rotary thrust thereto in one direction upon reciprocating actuation of said sets of mechanisms, a reciprocating member for each set of mechanism, an arcuate link slidably connected with each reciprocating member and actuated by said crank shaft, pivotally mounted supporting arms pivotally connected with said links, and worm mechanism slidably connected with said supporting arms to adjust said arcuate links in unison.

In testimony that I claim the foregoing as my own, I hereby affix my signature.

WILLIAM KESSLER.